United States Patent [19]
Sanders

[11] 3,908,052
[45] Sept. 23, 1975

[54] LIQUID CRYSTAL DISPLAY DEVICE AND METHOD OF MAKING

[75] Inventor: David A. Sanders, St. Paul, Minn.

[73] Assignee: Minnesota Mining and Manufacturing Company, St. Paul, Minn.

[22] Filed: Mar. 6, 1974

[21] Appl. No.: 448,550

[52] U.S. Cl. ............... 428/1; 206/316; 206/459; 428/35; 428/72; 428/73; 428/117; 428/178; 428/179; 428/339; 428/913
[51] Int. Cl.² ............................................. B32B 1/06
[58] Field of Search ......... 161/68, 1, 116, 122, 123, 161/127, 138, 146, 148, 182, 408, 410, 165; 252/299, 408 LC; 23/230 LC; 350/160 LC; 156/145, 309, 324; 206/44 R, 45.11, 45.31, 316, 528, 459, 484; 428/1

[56] References Cited
UNITED STATES PATENTS

| | | | |
|---|---|---|---|
| 3,441,513 | 4/1969 | Woodmansee | 161/410 X |
| 3,576,761 | 4/1971 | Davis | 161/410 X |
| 3,585,381 | 6/1971 | Hodson | 161/410 X |
| 3,619,254 | 11/1971 | Davis | 161/410 X |
| 3,620,889 | 11/1971 | Baltzer | 161/410 X |
| 3,813,279 | 5/1974 | Varner | 161/127 |

*Primary Examiner*—Marion E. McCamish
*Attorney, Agent, or Firm*—Alexander, Sell, Steldt & DeLaHunt

[57] ABSTRACT

Liquid crystals are packaged in conveniently usable sheet form to provide a colored display of unusual brilliance. The products are made by enclosing the liquid crystals in contiguous shallow closed cells between films heat sealed along cell-defining lines.

13 Claims, 6 Drawing Figures

LIQUID CRYSTAL DISPLAY DEVICE AND METHOD OF MAKING

BACKGROUND OF THE INVENTION

This invention relates to liquid crystal display devices and methods of making them.

The class of chemical compounds known as liquid crystals has been known since at least as early as 1889, when they were observed and commented on by the Austrian botanist Friedrich Reinitzer. Unlike normal crystals, these compounds do not melt directly into a clear, true liquid state; instead, they pass through a mesophase, or liquid crystalline phase, in which their appearance is cloudy and they retain some crystalline properties. The temperature at which the mesophase is superseded by a true liquid state, typically 5° to 20°C. higher than the melting point, is called the clearing point.

Liquid crystals are generally cigar-shaped compounds which are characterized by the molecular arrangement in which they exist in the mesophase and are designated smectic, nematic, or cholesteric. Smectic crystals have their long axes parallel to each other and perpendicular to the plane of the myriad monomolecular layers in which they exist. Nematic liquid crystals are not so highly ordered as smectic substances; although the molecules are arranged with their long axes parallel, they are not separated into layers. In cholesteric liquid crystals (so termed because their molecular structure is characteristic of a large number of compounds which contain cholesterol or derivatives thereof), the molecules are arranged in a manner similar to that found in the nematic state, except that the average ordering direction of the molecule varies in helical fashion, with the helical axis being perpendicular to the long axes of the molecules. For illustrative purposes, the structure may be considered to be divided into discrete layers, in each of which the liquid crystals are parallel to each other and to the plane of the layer.

One of the striking optical characteristics of cholesteric liquid crystals is their response to subtle changes in temperature. A cholesteric mesophase possesses the ability to scatter white light over a specific temperature range within the mesophase. As previously noted, the molecules in cholesteric liquids may be practically regarded as ordered in layers, the distance between layers determining the wave length of radiation which is scattered back to the observer. If the distance between the layers is the same as that of a wave length of visible light, the color represented by that wave length is scattered back to the observer, all other wave lengths being passed through unchanged. If the layers are somehow disturbed, e.g., by a change in temperature so that the inter-layer distance changes, the color of the scattered light will also change. Typically, the light scattered may be throughout the complete spectrum of red to blue, but certain mixtures exist which display only a portion of the spectrum. In any event, the thermochromic characteristic of cholesteric liquid crystals makes them useful in visual display devices for noting temperature changes which occur in that temperature range in which they scatter light in the manner described. Liquid crystals having different thermochromic properties may, of course, be blended to arrive at mixtures which change color in a desired temperature range.

Since the observed color of a liquid crystal is the result of the scattering in incident light, rather than its absorption, the colors are most easily observed against a black or dark background which absorbs the light transmitted through the liquid crystal. As another natural result of the light scattering color generation, the brilliance of the color display is directly related to the level of the incident light which is supplied.

Since liquid crystals are useful only in their liquid state, they present all the delivery and handling problems normally associated with fluids. In addition, there are other problems which result from the chemical and physical properties of their mixtures and necessitate their protection from environmental factors. For example, a cholesteric liquid crystal mixture must be protected from dust or other foreign particles which would adhere to its oily or sticky surface, disrupting the surface homogeneity and uniformity of colored display. Such a mixture must also be protected from oxidation, chemical contamination, and photochemical reactions, all of which affect the temperature at which a particular color change occurs. A still further problem associated with a cholesteric liquid crystal mixture is its tendency to separate upon standing or extended storage because one or more of the components returns to the solid state, the condition subsequently spreading throughout the entire mixture and rendering it inoperative for its intended purpose.

It was recognized early in the development of the art that protection of liquid crystals was necessary if the useful life of the system was to be preserved, and various packaging, or encapsulating, techniques were developed. See, for example, U.S. Pat. Nos. 3,576,761 and 3,620,889, both of which respectively disclose a liquid crystal material sandwiched between peripherally sealed polyethylene sheets. While such structures greatly help in preventing contamination, the large area of liquid crystal material functions as a heat sink, so that subtle color changes cannot be detected with precision, a problem which is further aggravated by the increased ability of the liquid crystal material to distribute itself unevenly. Additionally, the utility of such products is limited because of an inability to subdivide them without effectively destroying their utility.

Another attempt to cope with the packaging and delivery of liquid crystals is shown in U.S. Pat. No. 3,697,297, which describes the micro-encapsulation of cholesteric liquid crystals in tiny gelatin shells, permitting them to be dispersed in a binder and coated on a sheet substrate. While this technique is effective in retarding contamination and degradation, the resulting color display is significantly less brilliant than when the liquid crystals are coated directly on a flat substrate. Further, this method of packaging liquid crystals involves a multi-step procedure and greatly increases the cost of the delivery system.

Prior to the present invention, then, it is believed that there has never been available a simple, inexpensive, readily subdividable package of liquid crystals which afforded brilliant color display. Equally significantly, no commercially feasible way of making such a package has been recognized.

SUMMARY OF THE INVENTION

The present invention packages liquid crystals in a convenient manner which overcomes the disadvantages inherent in all of the prior art structures of which applicant is aware. Liquid crystals can be packaged extremely inexpensively in a form which permits convenient subdivision into packages of the desired size and shape, which presents color display of unusual brilliance, which maintains liquid crystal layers of substantially constant thickness, and thus is rendered capable of a wide variety of applications.

In accordance with the invention, a laminated product is formed from a substrate, a transparent covering layer comprising thin, flexible, transparent polymeric film bonded to the substrate along narrow lines which intersect to define a multiplicity of small cells, and a thin layer of liquid crystal material within the cells. The product is conveniently prepared from a pair of heat-sealable flexible sheet materials, each consisting essentially of a 0.2–2 mil stratum of polyethylene or other heat-sealable composition laminated to a 0.5–10 mil stratum of biaxially oriented polyethylene terephthalate or other suitable material. The sheet materials are juxtaposed with their heat sealable surfaces in opposed relationship and a liquid crystal composition interposed. The two sheet materials and the liquid crystal are then fed into the nip between a pair of squeeze rolls, the first squeeze roll having a cover of compressible rubberlike material, and the second having a circumferentially outer portion of incompressible heat-conductive material, the peripheral surface being defined by narrow intersecting ridges which enclose spaces therebetween. The second squeeze roll is provided with a means for heating, so that its peripheral surface can be heated to a temperature at least equal to that at which the heat sealable layers bond under pressure. As pressure is applied to the rolls, the juxtaposed sheet materials and interposed liquid crystal composition are then fed through the nip, the rate of passage, temperature of the second roll and the force between the rolls being controlled to effect sealing of the juxtaposed surfaces together along intersecting lines corresponding to the ridges on the heated roll, thereby confining the liquid crystal composition within cells defined by the lines. It is considered surprising that heat sealing can be effectively accomplished in the presence of an oily material, which would be expected to prevent such sealing from taking place.

A means for monitoring temperature is conveniently prepared by attaching, e.g., by adhering, to a surface whose temperature is desired to monitor, the article prepared by the steps described in the preceding paragraph.

BRIEF DESCRIPTION OF THE DRAWINGS

Understanding of the invention will be facilitated by referring to the accompanying drawings, in which like numbers refer to like parts in several views, and in which.

DESCRIPTION OF PRESENTLY PREFERRED EMBODIMENTS

Understanding of the invention will be still further enhanced by a more detailed study of the accompanying drawings.

Figure 1:
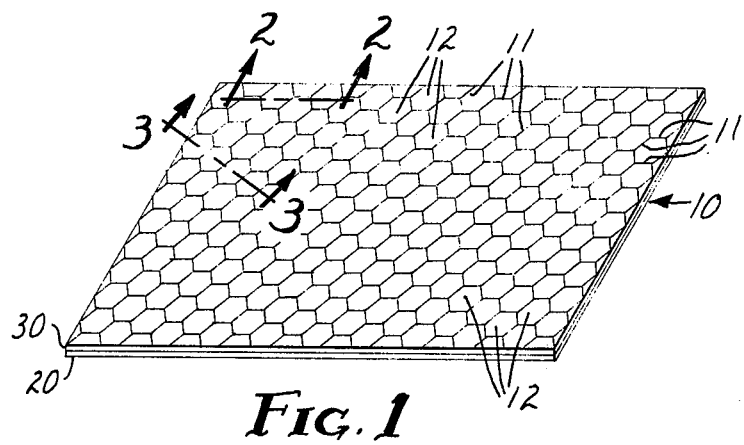
FIG. 1 is the perspective view of a sheet material formed in accordance with the present invention.
Figure 2:
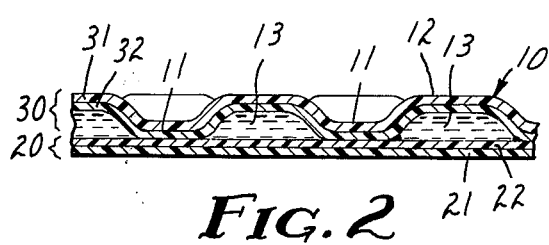
FIG. 2 is a cross-sectional view of the article of FIG. 1, taken on section lines 2—2 and looking in the direction of the arrows.
Figure 3:
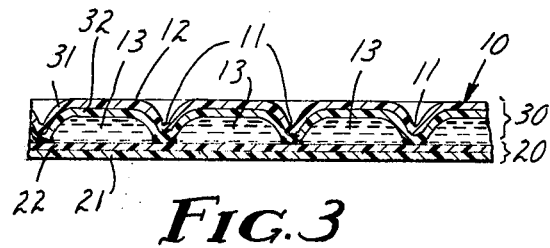
FIG. 3 is a cross-sectional view of the article of claim 1, taken on section lines 3—3 and looking in the direction of the arrows.

Turning first to FIGS. 1–3 inclusive, temperature indicating sheet material 10 is a composite laminate comprising substrate 20 and covering layer 30, which are joined together along narrow intersecting heat seal lines 11 to define contiguous cells 12. Substrate 20 comprises support film 21, to the upper face of which is adhered thin heat sealable film 22; in analogous manner, covering layer 30 comprises support film 31, to the lower face of which is adhered thin heat sealable film 32. Enclosed within cells 12 is liquid crystal material 13.

It has been found convenient to form both substrate 20 and covering layer 30 from films of biaxially oriented polyethylene terephthalate having on one face a thin layer of polyethylene, which melts at a temperature substantially below that at which the polyethylene terephthalate softens, such material being commercially available from Minnesota Mining and Manufacturing Company under the registered trademark designation "Scotchpak." Other functionally equivalent materials may also be used to prepare films 21, 22, 31 and 32. To illustrate, biaxially oriented methyl methacrylate, cellulose acetate, or polyvinyl chloride may be employed as either film 21 or 31. Similarly, a heat-activated or heat-sealing adhesive which does not react with liquid crystal composition 13 may be coated on film 21, film 31 or both. As still another example, cover film 30 may consist entirely of biaxially oriented polymethyl methacrylate, substrate film 20 being biaxially oriented polyethylene terephthalate coated with methyl isovinyl acrylate, a pressure-sensitive adhesive which bonds firmly to polymethyl methacrylate under the influence of heat and pressure. In any case, the resultant product must be one which has contacting surfaces such that they may be converted by heat into a viscous flowable condition during hermetic sealing. Generally speaking, such heat sealable layers should not be activated until a temperature of at least about 100°C. is reached, since the ultimate sheet material 10 is likely to be used for monitoring lower temperatures.

The specific dimensions of composite substrate film 20 and covering film 30, and their component parts, is subject to considerable variation without departure from the spirit of the invention. For example, where polyethylene is employed as heat sealing film 22 and 32, the thickness in each case should be at least 5 microns to obtain adequately strong heat seals, and probably should not exceed about 50 microns, lest the width of the heat seal lines 11 become excessive. In order to maximize the brilliance of color display in the final product 10, the thickness of polyethylene film 32 (which inherently possesses a small degree of haze) should be held to a minimum. Similarly, in order to insure that the area occupied by color-displaying cells 12 is maximized and the area occupied by heat seal lines 11 is minimized, the thickness of the polyethylene thickness in the range of 10–25 microns represents a useful compromise.

Biaxially oriented polyethylene terephthalate film is highly transparent, and the thickness of films 21 and 31 which are employed in making sheet material 10 are determined by the desired degree of stiffness or flexibility, the need to protect liquid crystal mixtures 13, economy, and the ability to attain satisfactory heat seals. Generally speaking, where films 21, 31 are biaxially oriented polyethylene terephthalate, they may range from about 10 to 250 microns in thickness, there generally being no advantage to exceeding 100 microns. If the thickness of the polyethylene terephthalate layer falls below about 10 microns, however, flexural properties of the film are difficult to control in production, and sheet 10 is subject to distortion during manufacture, which in turn causes cells 12 to be non-uniform in thickness and the content of liquid crystal material 13 to vary from cell to cell.

The ultimate thickness of sheet material 10 may range from about 50 to 500 microns, slightly exceeding the combined thickness of the individual component layers because of a slight bulging which occurs during heat sealing. In the presently most preferred embodiment of the invention, the overall thickness of sheet material 10 should be approximately 100–125 microns.

If sheet material 10 is to be affixed to a dark-colored (preferably black) surface, substrate 20 may be transparent. Where, however, the surface to which sheet material 10 is to be attached may be either pastel in color or actually transparent, substrate 20 should contain sufficient dye or pigment to impart a dark light-absorbing color, preferably black. An alternative involves incorporating carbon black or similar dark pigment in liquid crystal mixture 13 itself, a technique which may, however, contaminate the liquid crystal mixture 13 and change the temperature at which its color display occurs.

The actual dimensions and shape of cells 12, while not critical, involves a consideration of points previously discussed. For example, the larger the area of individual cells 12, the greater the possibility that the thickness of liquid crystal mixture 13 will vary from place to place within the cell, particularly if the surface to which sheet material 10 is attached has an irregular contour. On the other hand, the smaller the area of individual cells 12, the greater the percentage of surface which is occupied by cell-defining heat seal lines 11, which, of course, do not themselves provide any color display. All things taken into consideration, the interior dimensions of cells 12 should be in the range of about 0.8 to 12.5 mm, preferably between about 1.5 and 6 mm. Heat seal lines 11 should be as narrow as is consistent with effective sealing but should generally be at least 250 microns wide to insure maintaining the cell integrity under conditions of normal handling.

While the exact shape of cells 12 may be that of virtually any regular or irregular polygon, hexagonal shapes have been found particularly satisfactory in presenting the combined virtues of strength, attractiveness, and minimal line:cell area ratio.

Figure 4:
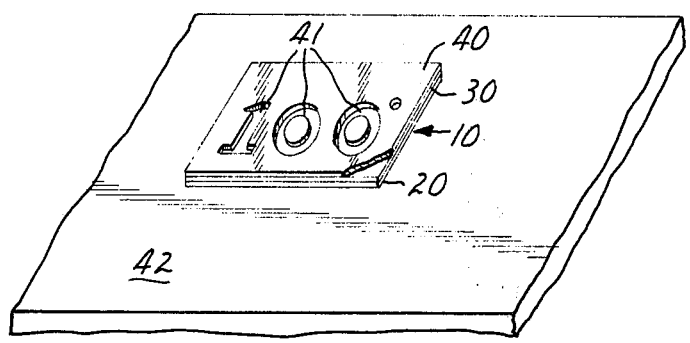
FIG. 4 is a perspective view showing a portion of an article having the sheet of FIG. 1 attached to the surface thereof for purposes of monitoring temperature.

FIG. 4 depicts a small portion of sheet material 10 affixed to the surface 42 of an article whose temperature it is desired to monitor. Since, liquid crystal mixture 13 is normally colorless but presents a color display when heated to a temperature of 100°, mask 40, with cutout portions 41, is applied to the upper surface of sheet material 10. Mask 40, which may be prepared either by die-cutting opaque sheet material or applied by spraying, preferably matches the appearance of sheet material 10 in the absence of the mask; the appearance is thus mono-colored until the temperature is reached at which the liquid crystals present their color display; becoming visible through the exposed portion of the upper surface of sheet material 10.

Because the function of sheet material 10 is not dependent upon the specific liquid crystal composition 13 which is employed, no detailed description of such composition is believed essential. Suffice it to say that most common derivatives of cholesterol exist at some temperature in the cholesteric mesophase, examples of such derivatives including ester, ether, or carbonate linkages of the basic sterol portion of the molecule to saturated or unsaturated alkyl, aryls, aryl substituted alkyls, alkyl substituted aryls, halogens, etc. The temperature display systems will employ liquid crystals composed of mixtures of two or more mesomorphic compounds, blended in a predetermined ratio to provide a desired color-temperature response. Examples of such mixtures are set forth in U.S. Pat. No. 3,441,513, the disclosure of which is incorporated herein by reference.

Figure 5:
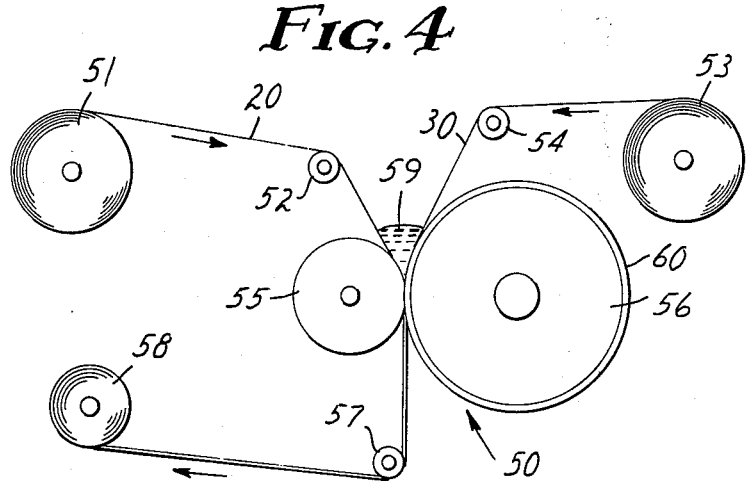
FIG. 5 is a schematic view showing a method of manufacturing articles in accordance with the present invention.

FIG. 5 depicts, in stylized form, manufacturing equipment 50 suitable for preparing sheet material 10 in accordance with the present invention. As shown, composite substrate film 20 is fed from supply roll 51 in the direction of the arrow, over steering roll 52, while composite covering layer film 30 is fed from supply roll 53 in the direction of the arrow, over steering roll 54. Positioned directly below converging films 20 and 30 are resilient support roll 55 and heated embossing roll 56. As films 20 and 30 pass into the nip between rolls 55 and 56, a bead of liquid crystal material 59 is introduced between the converging films and enclosed in individual cells formed as films 20 and 30 are heat sealed together along cell-defining lines. Sheet material 10 then passes around idler roll 57 to winder roll 58, where it is wound convolutely upon itself to await subsequent conversion to desired dimensions.

Figure 6:
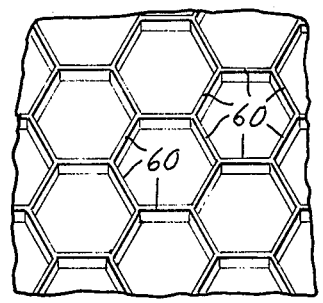
FIG. 6 is an enlarged view of a portion of the surface of the embossing drum which is part of the apparatus shown in FIG. 5.

FIG. 6 is a greatly enlarged view of a portion of the surface of embossing roll 56, depicting an intersecting array of ridges 60 which impart heat seal lines 11 to sheet material 10 during the embossing process. Ridges 60 are formed of heat-conductive material, the entire surface of roll 56 normally being made of metal which has been machined or chemically milled to expose ridges 60 to a depth of perhaps 2 mm. Purely by way of illustration, satisfactory results have been obtained using the aforementioned Scotchpak films, respectively 38 and 65 microns thick, under the following conditions: feed rate, 2 meters per minute; roll pressure, 1 kg per cm width; temperature of embossing roll 56, 145°C.; hardness of support roll 55, Shore A 65; space between ridges on embossing roll 56, 3 mm; width of ridges 60, 25 microns. Changing one of the foregoing operating parameters may, of course, necessitate corresponding adjustment of other parameters to achieve the same result. In any event, however, those skilled in the art are familiar with the interrelation of such variables and will have no difficulty in arriving at conditions suitable for carrying out the process and achieving suitable finished sheet material.

It will be appreciated, of course, that the specific arrangement shown in FIG. 5 is purely illustrative. Thus, for example, a coating of liquid crystal mixture 59 may be applied to one or both of the converging surfaces of substrate 20 or covering layer 30 by knife, a roll coater, Mayer bar, etc.

As has been indicated, the amount of liquid crystal material employed in preparing sheet material in accordance with the invention is comparatively low. Thus, for example, on the order of 2–5 grams of liquid crystal material is adequate to prepare one square meter of sheet material, the amount employed being directly related to the dimensions of individual cells. In each case, however, it should be emphasized that the sheet encapsulation process desirably completely excludes the presence of any air in the cells, the liquid crystal material completely filling, and being hermetically sealed within, each of the cells. What is claimed is:

1. As a new article of manufacture, a laminated product adapted for providing colored visual displays of unusual brilliance, comprising in combination:
   a substrate,
   a transparent covering layer comprising thin, preformed self-supporting flexible transparent polymeric film bonded to said structure along narrow lines which intersect to define a multiplicity of small contiguous closed cells, and
   a thin layer of liquid crystal material within and completely filling said cells.

2. The article of claim 1 wherein both the substrate and the covering layer comprise heat sealable sheet material.

3. The article of claim 2 wherein the substrate sheet material is dark in color to enhance the visual display.

4. The article of claim 2 wherein each of the sheet material consists essentially of a heat sealable unoriented first stratum of thermoplastic polymer and a second stratum of biaxially oriented film-forming polymer.

5. The article of claim 4 wherein each of the two first strata is polyethylene and each of the two second strata is biaxially oriented polyethylene terephthalate.

6. The article of claim 5 wherein each of the two first strata is about 5–50 microns thick and each of the two second strata is about 10–25 microns thick.

7. The article of claim 6 wherein the overall thickness of the article is about 100–125 microns.

8. The article of claim 1, wherein each of the cells is hexagonal.

9. The article of claim 8 wherein the area inside the cell walls is at least 90 percent of the total area of one face of said article.

10. The article of claim 9 wherein the color of the liquid crystals is temperature-dependent.

11. A means for monitoring temperature comprising the article of claim 10, the substrate thereof being attached to a surface whose temperature it is desired to monitor.

12. The article of claim 5 wherein each of the two first strata is about 10–25 microns thick and the second stratum of the covering layer is 10–125 microns thick.

13. A method of making the article of claim 1 comprising the steps of:
   a. providing a pair of thin, heat-sealable flexible sheet materials of substantially uniform thickness,
   b. juxtaposing said sheet materials with their heat-sealable surfaces in opposed relationship,
   c. interposing between said opposed surfaces a liquid crystal composition,
   d. providing a pair of squeeze rolls
      1. the first of said pair of squeeze rolls being provided with a cover of compressible rubber-like material,
      2. the second of said pair of squeeze rolls being provided with means for heating and having a circumferentially outer portion of incompressible heat-conductive material, the peripheral surface of said portion being defined by narrow intersecting ridges which encloses spaces therebetween,
   e. heating the peripheral surface of said second squeeze roll to a temperature at least equal to that at which the heat sealable surfaces bond under pressure,
   f. applying pressure to said rolls,
   g. passing between said squeeze rolls the juxtaposed sheet materials and interposed liquid crystal composition, and
   h. controlling the rate of passage, the temperature and pressure to effect sealing of the opposed surfaces of the sheet material along intersecting lines corresponding to the ridges on the heated roll, thereby confining the liquid crystal composition within cells defined by said lines.

* * * * *

UNITED STATES PATENT AND TRADEMARK OFFICE
CERTIFICATE OF CORRECTION

PATENT NO. : 3,908,052
DATED : September 23, 1975
INVENTOR(S) : David A. Sanders It is certified that error appears in the above-identified patent and that said Letters Patent are hereby corrected as shown below:

Column 1, line 67, "in incident" should read --of incident--.

Column 4, lines 65-67, "11 is minimized, the thickness of the polyethylene thickness in the range of 10-25 microns represents a useful compromise." should read --11 is minimized, the thickness of the polyethylene layer 22, 32 should be minimized. A polyethylene thickness in the range of 10-25 microns represents a useful compromise.--

Column 8, line 29, claim 13, "encloses" should read --enclose--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*